Figure 1:
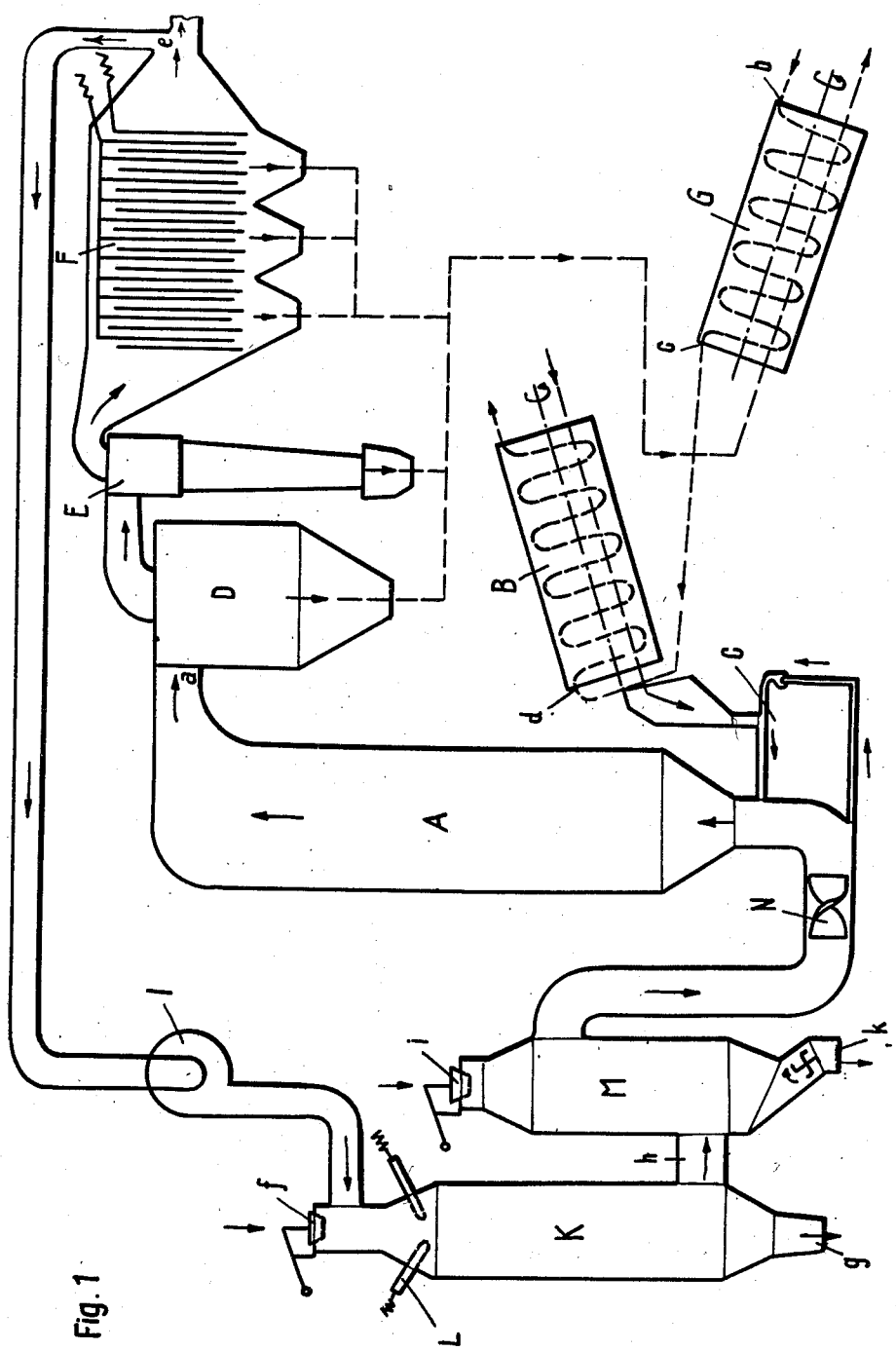

Feb. 19, 1957

G. STROHMEIER 2,782,022

APPARATUS FOR PREPARING METALS AND ALLOYS FROM
SUBSTANCES, CONTAINING FINE-GRAIN METAL

Filed April 17, 1953

3 Sheets-Sheet 1

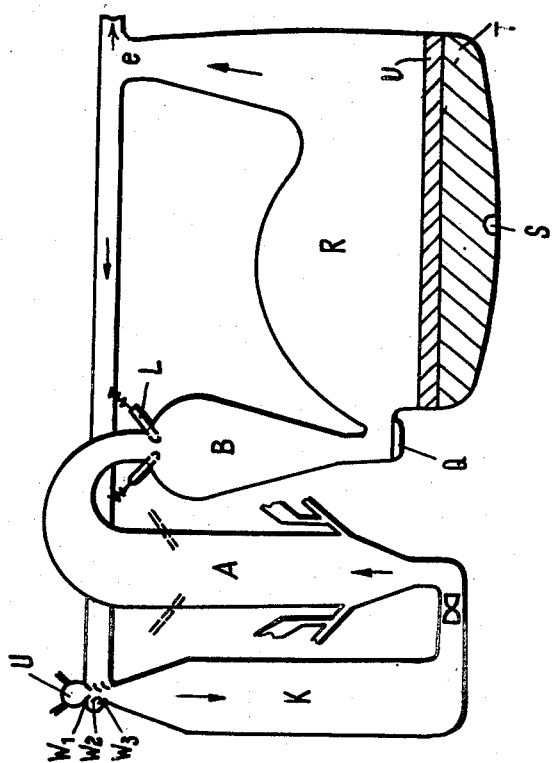
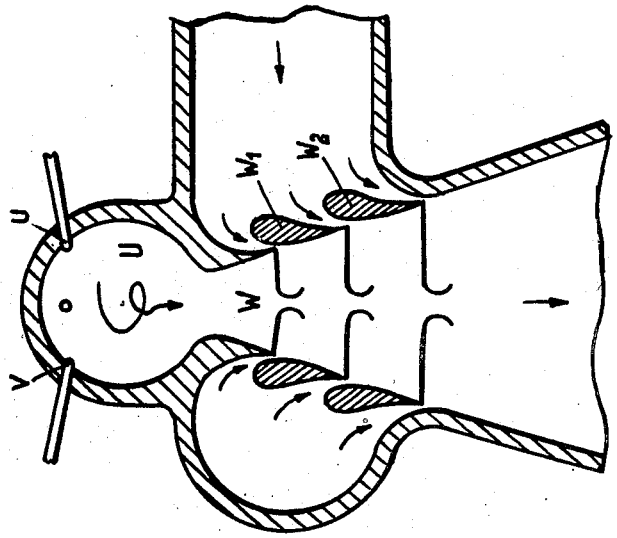

United States Patent Office 2,782,022
Patented Feb. 19, 1957

2,782,022

APPARATUS FOR PREPARING METALS AND ALLOYS FROM SUBSTANCES, CONTAINING FINE-GRAIN METAL

Gerolf Strohmeier, Leoben, Austria

Application April 17, 1953, Serial No. 416,293

2 Claims. (Cl. 266—8)

This invention relates to an apparatus for reducing artificial as well as natural metal ore containing substances by common reducing-gases, containing CO, or by gas mixtures such as are successfully used for the preparation of well-known iron-sorts and iron-alloys by reduction with carbon-monoxide.

Hitherto the coke- or blast-furnace has been the most usual equipment for the production of iron. This, however, has certain disadvantages, such as the very critical physical and chemical requirements as far as the loading material is concerned; the introduction of sulfur into the pig-iron caused by the coke-ashes; as well as its enrichment, together with other elements accompanying iron; the necessity of evaluating waste-gas as well as slags—the latter not having found a satisfactory solution yet; the slow rate of reaction and, associated with this, the long time it takes to pass from the blast-furnace-mouth to the tapping; the high amount of nitrogen, that has to be taken along; the poor adaptibility to local conditions; etc.

Numerous methods to reduce iron-ores had been suggested in order to eliminate the disadvantages of the blast-furnace. Most of them were of no practical importance, because their advantages were by far outweighed by disadvantages, the economic consequences of which would be far more serious. Even those methods that have been applied practically, were able to maintain themselves as an adjunct to the blast-furnace process, rendered possible in certain cases by specific local conditions.

The various disadvantages of the methods hitherto known can be eliminated by the present invention, wherein fine metal-containing material is introduced into a stream of reducing-agents, containing considerable amounts of carbon-monoxide or water-gas to become suspended therein and, while thus suspended, being reduced to the metal. The reduced metal, according to the prevailing temperature, either was precipitated in solid or in liquid form from the gas-phase. After the metal is removed, the gas-stream is returned to its original composition by carburizing the excess of gas. If necessary, the gas is treated with purifying agents before, or even better, after it is branched-off and thus it can be used again in the process, the regenerated gas-stream then replacing the reducing agent in the zones, where the fine material is introduced. The reduction of fine metal-containing material in running reducing-gases and in a reduction-cycle, that can be reestablished by washing out the formed $CO_2$ and by adding CO-containing gases, has already been suggested before.

Further, the reduction of ores or oxygen-compounds by using a gas-cycle the amount of which is adjustable by gas development and the composition of which can be regenerated by quick lime and carbon-containing solids, is known as well. In this process pieces or a powder of the metal-containing material were exposed to a circulating gas-stream. That gas stream, however, was not used as the reducing agent itself. These methods only were suggested for making solid products. As experience indicated, they could not be extended to the production of molten metals or alloys.

Another suggestion to reduce fine iron-oxide consists in taking the reducing gas from some appropriate source. The fine iron-oxide is agitated together with the gas-stream and thus gets reduced. The reduced particles are precipitated in solid form. The apparatus necessary for this operation does not involve a gas-cycle, that can be regenerated and therefore sources of reducing-gas from outside are necessary.

Finally another furnace was described for the reduction of powdered ores, in which the powdered ore for a considerable period was kept suspended in a fire-column, that was formed by blowing fuel and air into the furnace. Liquid precipitation of particles of reduced metal is supposed to be possible that way. Application of a gas-cycle, however, is not possible in this procedure.

In comparison with those well-known methods, using fine metal-containing material and reducing gases, the present invention offers the advantage, that it can be applied as an independent branch of the iron production and does not depend on outside gas-sources.

Another advantage of the method, on which this invention is based, is the possibility to make steel, pig-iron, as well as powdered iron ready for both hot and cold-pressing, from the ore in a single process; further its adaptibility to local conditions, the possibility of constructing rationally and continuously working plants as well as the possibility of a selective mode of reduction by appropriate temperature-adjustment; thus, for example, it is possible to avoid the absorption of undesired elements by the iron and to enrich them in the slag instead.

The equipment necessary to carry out this invention mainly consists of 4 parts, fitting together as far as their construction is concerned: the reduction-vessel, installations for precipitation as well as for agitating and regenerating the cycling-gas.

The way the procedure is carried out is illustrated in the attached drawings. As shown by Figure 1 the powdered ore is blown into the reduction chamber A, by blower C after passing through a drum for pre-heating, B, and then in A wherein it is thoroughly mixed with CO. The reduction-chamber as illustrated is made in such way, that, provided that the appropriate flowing speed and gas-temperature are chosen, the reduction of the powdered ore occurs almost completely within this space. The resulting mixture of CO and $CO_2$ leaves the reduction-chamber in $a$, taking fine iron-particles along. Precipitation of these particles from the gas-stream occurs by well-known methods, adapted to prevailing temperatures, such as precipitators for coarse-grain, D, precipitators for fine-grain, E, and electro-filter, F. The precipitated particles pass to a cooling-drum, G, where they are cooled by cold air, blown into the drum. The air, that has become heated there, leaves the cooling-drum at $c$ and is introduced into the preheating-drum wherein it is used to preheat the powdered ore in $d$. When temperature of the gas-stream is varied, the precipitated iron-particles can show any structure from sponge-like to spherical. In order to effect precipitation of a powder of sponge-like structure, the temperature of the gas is not allowed to exceed the liquidus-line of the metal or alloy respectively; while for the precipitation of a powder with spherical structure the temperature of the liquidus-line first has to be surpassed and, before precipitation of the powder, the temperature has to be lowered below the solidus-line. After the iron-particles have been removed from the gas-mixture, a sufficient amount of the cycling-gas is branched off at $e$. This gets sucked into the carburizer, K, by blower I, where solid carbon-containing material, such as coke, is added at inlet $f$ and ash is removed through outlet $g$. In the carburizer the gas is regenerated. The necessary heat can be supplied by an arc, produced between the electrodes L. The reestablished gas leaves the carburizer through opening $h$ and now enters a de-sulfurizing equipment M, filled with quick lime, that is introduced at inlet $i$, and from which the lime is removed through outlet $k$ after use. From there the gas after having passed equipments N, where it gets whirled, and after having been partly charged with powdered ore, that is blown in at C, is introduced into the reduction-chamber A.

Figure 2:
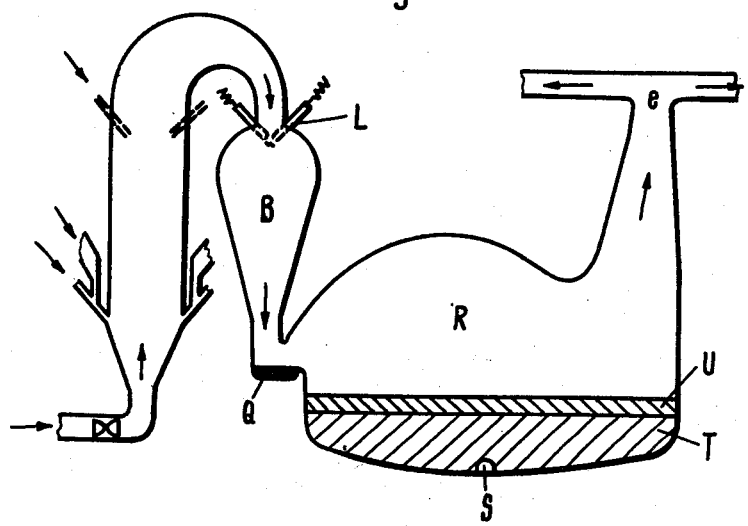

Fig. 2 shows an equipment for the production of a liquid end-product. Here the gas-stream, after the reduction is accomplished, enters the melting chamber B, together with the suspended iron-particles, where the heat, required for melting, may, for instance, be provided by an arc formed between the electrodes L. Precipitation of liquid particles for instance may be done by the deflecting-plates Q. The surface of the bath, however, may just as well be used as a deflecting-plate. These liquid particles now get collected in R, out of which the molten material is tapped off at S. The drawing also shows the iron-bath T inside R and the slag-zone above is indicated (U). The gas, after the liquid iron-particles have been removed, in $e$ again gets divided into cycling and remaining gas and then is treated as described in the preceding example.

The procedure, on which this invention is based, also can be carried out in such way, that non-suspendable material that may be present as well, can be reduced by counter-current or a separation of suspendable from non-suspendable ore can be done by introducing more or less fine ore into an appropriately shaped reduction-chamber, where it is placed in contact with the flowing gas. The suspendable part can be prepared in the described manner, while the non-suspendable parts gets completely reduced by well-known methods, such as slow sedimentation within the gas-stream and further treatment in special, additional chambers, and thus gets removed from the cycle. In most cases, however, it is more convenient to carry out the sifting of the material outside the reduction-chamber, for instance associated with a roasting-process or a pre-reduction with the remaining gas.

Not only the described equipments can be used for agitating the gas-cycle, but also the various spray-nozzle-systems, as applied in the nozzle-condenser, nozzle-motor, rocket-motor, the pulsating shearing-nozzle etc.

Figure 5:
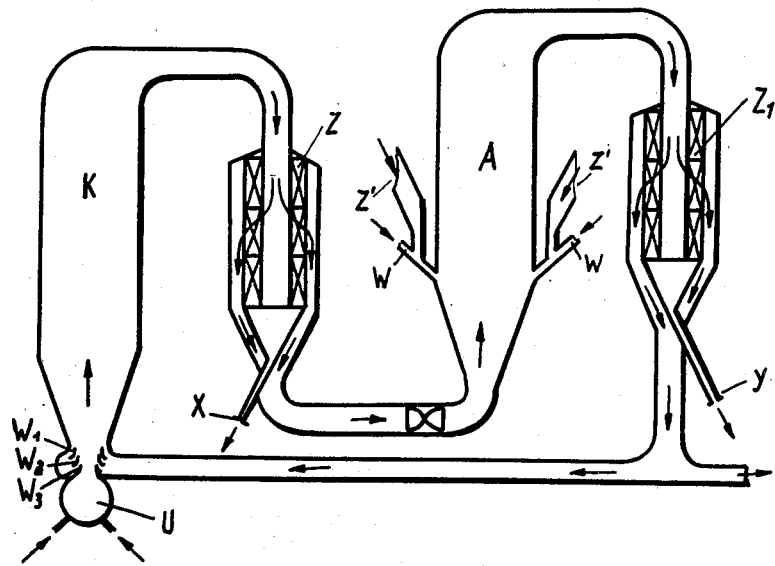

By means of such spray-nozzle-systems, for instance regeneration of $CO_2$ to $CO$ can be carried out with powdered carbon and commercially prepared oxygen. Thus the heat necessary for endothermic carburation as well as for providing the shearing-stress is developed by combustion of part of the carbon, while the rest of the carbon is available for the reaction with $CO_2$ in order to give $CO$. Fig. 3 shows the design of an apparatus for this purpose. In the combustion-chamber U the powdered carbon, blown in together with water-vapor by $u$ becomes mixed with the oxygen, blown in by $v$. The water-vapor may equally as well be replaced by a branched-off part of the cycling- or remaining gas. Several installations for blowing-in the gas may be provided as well for instance perpendicular to each other and not radially arranged. In this manner carbon will become partly oxidised to CO. Owing to the developed heat as well as to the increase in volume this mixture will be discharged through a tube, attached to the combustion-chamber U, that gradually gets larger—the nozzle W. Additional nozzles ($W_1$, $W_2$) are attached to this nozzle, by which the cycling gas, that has to be regenerated, gets sucked and simultaneously mixed very intimately with the carbon, flung out of the combustion-chamber U. Fig. 4 shows this spray-nozzle-mechanism in connection with the equipments used for the invention similar to Fig. 2 in the way it is used for liquid precipitation. Fig. 5 illustrates the equipment, by which precipitation of the reduced metal in powder-form is possible, that mainly can be used for treating carbon-material with high ash-content. The mixture, that was formed in the combustion-chamber U of the spray-nozzle-motor, into which, for instance also quick-lime can be blown besides carbon, from there gets flung through the nozzles W and thus the cycling-gas gets sucked into $W_1$ and $W_2$. Then it flows through the carburizer, K, and then passes into a purifying equipment Z, that, for instance, may be provided with a whirling-sieve as shown in the Austrian Patent No. 169,559. Precipitated ash-particles and other solid impurities contained in the gas thus get separated and can be removed in $x$. Now the purified gas, after having been loaded with the powdered ore by blowing in the remaining gas in $w$ and adding the powder in $z$, introduced in the reduction-chamber A and finally sucked through $Z_1$, that conveniently is provided with the whirling-sieve, as mentioned above, as well. Here the reduced powdered iron is removed from the cycling-gas and can be taken from the equipment in $y$.

The well-known modifications of spray-nozzle-mechanisms can just as well be used for blowing the powdered ore into the reaction-chambers.

I claim:

1. Apparatus for reducing metal from its ore in ore suspended as a fine powder in a reducing gas comprising a reduction chamber, a dust precipitation chamber connected for removal of dust from the gas passed from said reduction chamber, means for regenerating a portion of the reaction gas connected for receiving the gas from said dust precipitation chamber, means for agitating the regenerated gas, and means for passing said regenerated gas to said reduction chamber.

2. Apparatus as claimed in claim 1, wherein the recycled gas agitating means comprises a spray nozzle mechanism.

References Cited in the file of this patent

UNITED STATES PATENTS

| | | |
|---|---|---|
| 1,759,173 | Smith | May 20, 1930 |
| 2,184,300 | Hodson et al. | Dec. 26, 1939 |
| 2,538,201 | Kalback et al. | Jan. 16, 1951 |
| 2,547,685 | Brassert et al. | Apr. 3, 1951 |